(12) United States Patent
Genga et al.

(10) Patent No.: US 6,250,323 B1
(45) Date of Patent: Jun. 26, 2001

(54) ELECTRONIC MOTORIZED ZONE VALVE

(75) Inventors: Richard A. Genga, E. Greenwich; Hamid Pishdadian, Warwick, both of RI (US)

(73) Assignee: Taco, Inc., Cranston, RI (US)

( * ) Notice: Subject to any disclaimer, the term of this patent is extended or adjusted under 35 U.S.C. 154(b) by 0 days.

(21) Appl. No.: 09/649,281

(22) Filed: Aug. 28, 2000

Related U.S. Application Data

(62) Division of application No. 09/079,815, filed on May 15, 1998.

(51) Int. Cl.$^7$ .................................................. F16K 31/02
(52) U.S. Cl. ..................... 137/1; 251/129.01; 251/129.11
(58) Field of Search ..................... 251/129.01, 129.11; 137/1; 361/156

(56) References Cited

U.S. PATENT DOCUMENTS

| | | | |
|---|---|---|---|
| 1,473,634 | * | 11/1923 | Loudon . |
| 2,977,437 | * | 3/1961 | Doane . |
| 3,011,754 | * | 12/1961 | Ander . |
| 3,334,859 | * | 8/1967 | Raymond, Jr. . |
| 3,387,748 | * | 6/1968 | Brenchley . |
| 3,430,916 | * | 3/1969 | Raymond, Jr. . |
| 3,667,727 | * | 6/1972 | Bowden . |
| 3,680,831 | * | 8/1972 | Fujiwara . |
| 3,870,274 | * | 3/1975 | Broe . |
| 3,974,427 | * | 8/1976 | Carson . |
| 4,364,111 | * | 12/1982 | Jocz . |
| 4,398,562 | * | 8/1983 | Saarem et al. . |
| 4,424,825 | * | 1/1984 | Hanson . |
| 4,546,671 | * | 10/1985 | Fry . |
| 4,556,832 | * | 12/1985 | Rollins . |
| 4,611,617 | * | 9/1986 | Hewitt . |
| 4,621,789 | * | 11/1986 | Fukamachi . |
| 4,705,063 | * | 11/1987 | Robinson . |
| 4,754,949 | * | 7/1988 | Fukamachi . |
| 4,800,308 | * | 1/1989 | Tice . |
| 4,809,748 | * | 3/1989 | Robins . |
| 4,845,416 | * | 7/1989 | Scholl et al. . |
| 4,889,315 | * | 12/1989 | Imanaga . |
| 4,987,408 | * | 1/1991 | Barron . |
| 5,085,401 | * | 2/1992 | Botting et al. . |
| 5,099,867 | * | 3/1992 | Emery . |
| 5,100,101 | * | 3/1992 | Shah . |
| 5,131,623 | * | 7/1992 | Giordani .................... 251/129.11 X |
| 5,137,051 | * | 8/1992 | Laur et al. . |
| 5,137,257 | * | 8/1992 | Tice . |
| 5,174,546 | * | 12/1992 | Giordani . |
| 5,205,534 | * | 4/1993 | Giordani . |
| 5,226,454 | * | 7/1993 | Cabalfin . |
| 5,255,891 | * | 10/1993 | Pearson et al. . |
| 5,278,454 | * | 1/1994 | Strauss et al. . |
| 5,342,024 | * | 8/1994 | Kim . |
| 5,381,996 | * | 1/1995 | Arnemann et al. . |
| 5,540,414 | * | 7/1996 | Giordani et al. . |
| 5,938,172 | * | 8/1999 | Ohtsuka et al. ................ 251/129.01 |
| 6,123,092 | * | 9/2000 | Torii ............................ 251/129.01 X |

\* cited by examiner

Primary Examiner—Kevin Lee
(74) Attorney, Agent, or Firm—Fish & Richardson P.C.

(57) ABSTRACT

An valve actuator in a hydronic heating and cooling system includes a motor for changing the position of a valve, a switch for switching power to the motor, and a sensor for detecting the arrival of the valve at a desired position and for stopping the motor without using a mechanical stop. The motor's power source includes a capacitive power source which can be used to drive the motor under low-power conditions.

1 Claim, 13 Drawing Sheets

ELECTRONIC MOTORIZED ZONE VALVE

CROSS-REFERENCE TO RELATED APPLICATION

This application is a divisional of copending application U.S. Ser. No. 09/079,815, filed May 15, 1998.

BACKGROUND OF THE INVENTION

The invention relates to actuators and zone valves for heating and cooling systems.

Zone valves are often utilized in hydronic heating and cooling systems. The zone valves isolate specific areas or "zones" of the system. Typically, each zone valve is controlled by a thermostat, which causes the valve to open and close to achieve desired temperature changes.

Conventional zone valves are typically actuated by either a heat motor or an electric motor. In valves with a heat motor as the actuator, an electrically heated element causes linear movement of an actuating element that, in turn, opens the valve. In valves with electric motors, the motor and associated gears move a valve member between closed and open positions (e.g., a rubber plunger moved away from a seat or a ball element moved through a 90 degree rotation).

Conventional motorized zone valve actuators employ a motor which is energized in one direction by a source of power, held in some predetermined position by a mechanical or electrical braking means, and then returned to its original position by a spring.

Giordani, U.S. Pat. Nos. 5,131,623 and 5,540,414, describe zone valves for hydronic heating or cooling systems in which a motor-driven actuator rotates a ball valve through about a 90° rotation, between closed and opened positions. The motor rotates the valve from its normal position, which may be either open or closed, to the opposite position, e.g., if the valve is normally closed, from the closed to the open position. When the motor is de-energized, the valve is returned to its normal position by a spring so configured that it provides sufficient restoring torque to overcome the frictional torque of the ball valve.

Carson, U.S. Pat. No. 3,974,427, discloses a motor control apparatus having an electric motor which is driven in one direction by an alternating current power source and in the opposite direction by a spring. Holding or braking of the motor is accomplished by applying a source of direct current power to magnetize the motor and hold it in a predetermined position after the alternating current power source is removed. This holding or braking action is removed by taking away the direct current power source and momentarily applying an alternating current power source to the motor, thereby de-magnetizing or degaussing the motor so that it is free to return to its initial condition under the power of the spring.

Fukamachi, U.S. Pat. No. 4,621,789, discloses a valve mechanism in which the valve is prevented by a physical stopper from moving any further after it has moved to an open or closed state.

Botting, et al, U.S. Pat. No. 5,085,401, discloses a valve actuator in which the motor makes an electrical contact after rotating a predetermined distance, causing deenergization of the motor.

Fukamachi, U.S. Pat. No. 4,754,949, discloses a valve actuator in which the rotation of the valve by a predetermined amount causes electrical contacts to be turned off, stopping the rotation of the actuator motor.

Some motorized valve actuator systems employ a fail safe energy system to provide power to the actuator motor in the event that the main power source is lost. Strauss, U.S. Pat. No. 5,278,454, discloses an emergency, fail safe capacitive energy source and circuit which is used to power an air damper actuator or a valve actuator. A sensor detects loss of power to the valve actuator circuit or motor, activating a switch which connects a bank of capacitors to the motor, with the appropriate polarity to drive the actuator back to its fail safe position. No provision is made for interrupting the connection between the capacitors and the motor when the fail safe position is reached, and thus the motor appears to work against a mechanical stop defining the fail safe position.

SUMMARY OF THE INVENTION

The invention features an actuator in which a sensor detects when the valve has reached a desired position, and controls a switch that shuts off the motor driving the valve. The invention makes it unnecessary to rely on a mechanical stop or a return spring to put the valve in a desired position. For example, a valve can be moved from open to closed and from closed to open, without relying on a mechanical stop or return spring. And switching a valve from normally-open to normally-closed can be done simply by throwing a single switch.

In one aspect, the invention features an actuator for actuating a valve in a hydronic system, wherein the valve has a first position in which fluid flow may occur along one path and a second position in which fluid flow is either blocked or may flow along another path. The actuator includes: a motor coupled to the valve, wherein rotation of the motor changes the position of the valve from one of the first and second positions to the other of the positions; a switch controlling the delivery of electrical power to the motor, the switch having a closed position in which electrical power is delivered to the motor and an open position in which power is not delivered; a sensor configured to detect the arrival of the valve at the first and second positions; and circuitry connected to the sensor and to the switch, the circuitry being configured to respond to the detection by the sensor of the arrival of the valve at one of the first and second positions by opening the switch to stop delivery of power to the motor.

Preferred implementations of the invention may include one or more of the following features: The sensor may be configured so that the output of the sensor changes state upon the arrival of the valve at a desired position. The sensor may have two states, and a change of state in its output occurs at approximately the moment when the valve, having begun to move from one of the first and second positions, reaches the other of the positions. The motor may rotate the valve in a single direction. An electrical power storage element (e.g., a capacitor) can be included in the actuator for providing power for driving the motor, sensor, and circuitry (e.g., when power to the actuator is lost). The circuitry for controlling the actuator can be provided by an integrated circuit chip. The valve may be a ball valve. The sensor may be an optical sensor. The actuator may have projections on a member that rotates with rotation of the valve and the projections may cause the sensor to become blocked and unblocked, and arrival of the valve at a position corresponds to blockage of the sensor by a projection either ceasing or beginning. The actuator may include a clutch for manually rotating the valve, and the position of the clutch may provide an indication of the angular position of the valve. The actuator may include a worm gear drive between the motor and the valve. A default-position selection switch may be included to enable the actuator and valve to be transformed from a normally-open valve to a normally-closed valve by movement of an electrical switch.

In a second aspect, the invention feature a zone valve for use in a hydronic system, in which the valve includes a ball element; a valve casing enclosing a ball element; a valve seat in contact with the ball element and the valve casing, the valve seat having a notch to receive an O-ring; an O-ring installed in the notch; a metallic, springy washer positioned in a compressed state within the valve casing in such a configuration as to provide an approximately constant force on the valve seat; and wherein the notch is shaped so that the axial force causes the O-ring installed in the notch to be compressed to improve a seal between the valve seat and an internal bore of the valve casing.

In a third aspect, the invention features operating a hydronic valve actuator by, prior to initiating movement of the valve, determining the charge on a capacitive power source and determining the energy required to complete the valve movement prescribed, and then deciding to initiate movement only if the charge on the capacitive power source is sufficient to provide the energy required to complete the movement.

In a fourth aspect, the invention features a hydronic valve actuator including a motor for driving the valve, wherein rotation of the motor changes the position of the valve from one of the first and second positions to the other of the positions; a gear assembly coupling the motor to the valve, wherein the gear assembly includes a worm gear; and a knob shaped to be turned manually either by grasping or by use of a tool; a clutch assembly connecting the knob to the valve stem and to the gear assembly, wherein the clutch assembly can be moved between engaged and disengaged modes, wherein in the engaged mode the gear assembly and worm gear are engaged with the valve stem so that the motor can turn the valve, and in the disengaged mode the gear assembly and worm gear are disengaged from the valve stem so that the valve can be turned using the knob.

Preferred implentations of this aspect of the invention may include one or more of the following features: The clutch assembly may be disengaged by pushing the knob axially. The clutch assembly may include teeth on two rotating members that are separated by axial motion of the knob to disengage the clutch. The knob may have a marking indicating the position of the valve.

Other features of the invention will be apparent from the following description of preferred embodiments, including the drawings, and from the claims.

DESCRIPTION OF THE PREFERRED EMBODIMENTS

Figure 1:
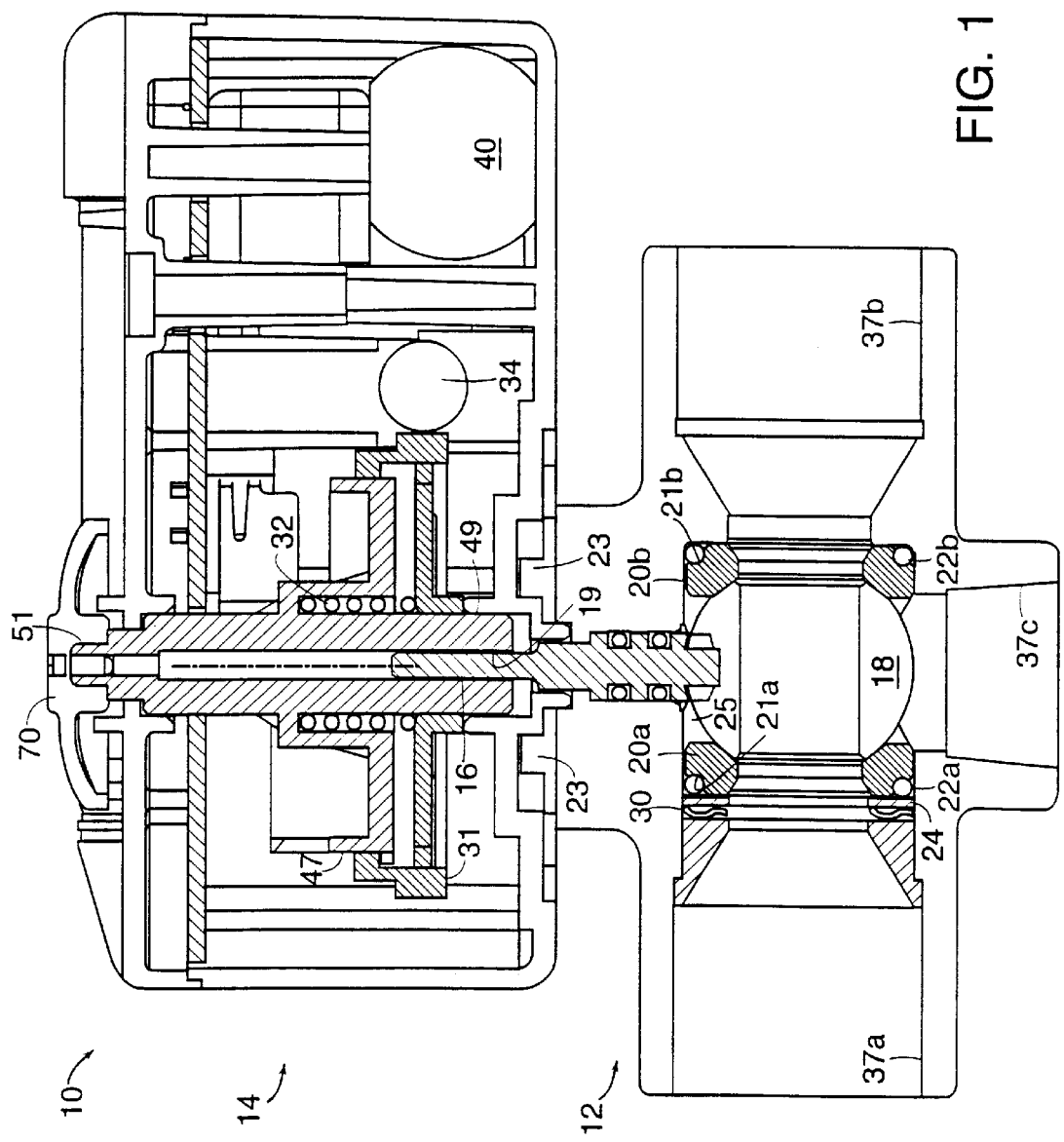
FIG. 1 is a cross-sectional view of a valve and actuator according to the invention.

FIG. 1 shows a preferred zone valve 10. Ball valve 12 is driven by actuator 14. The actuator is coupled to the valve body 26 (bronze forging) by a rotate-to-lock fastening arrangement 23. Flat-sided stem 16 extends from ball element 18 into a matching opening 19 in the actuator. The actuator is electrically operated, and has wires for coupling it to conventional power and control circuitry.

Fluid flows through the ball valve in a conventional manner. When the ball is in the open position, fluid flows through the ball element 18 from port 37a to port 37b. The valve is bidirectional, and thus either of ports 37a, 37b can be an inlet or an outlet.

Ball element 18 (brass) seals against seats 20a, 20b (Teflon), which are, in turn, sealed to the internal bore 25 of the valve forging by O-rings 22a, 22b, which sit in O-ring notches 21a, 21b. A wavy washer 30 (stainless steel) provides an axial force on the seats 20a, 20b (the curvature of the washer is exaggerated in the drawing). Notches 21a, 21b are shaped so that the axial force compresses the O-rings, causing them to press outwardly against the bore of the valve casing, to effect a seal between the valve seats and the bore. The wavy washer presses against backing ring 24 (stainless steel), which presses against O-rings 22a. By making the wavy washer out of a springy metallic material (e.g., stainless steel), it retains its resiliency over time. As O-rings 22a, 22b compress over time, the wavy washer expands while maintaining adequate axial force. Over the life of the valve, the wavy washer will compensate for the tendency of the Teflon valve seats to cold flow and/or wear; the washer will expand slightly, to maintain the seats in contact with the ball.

Figure 2:
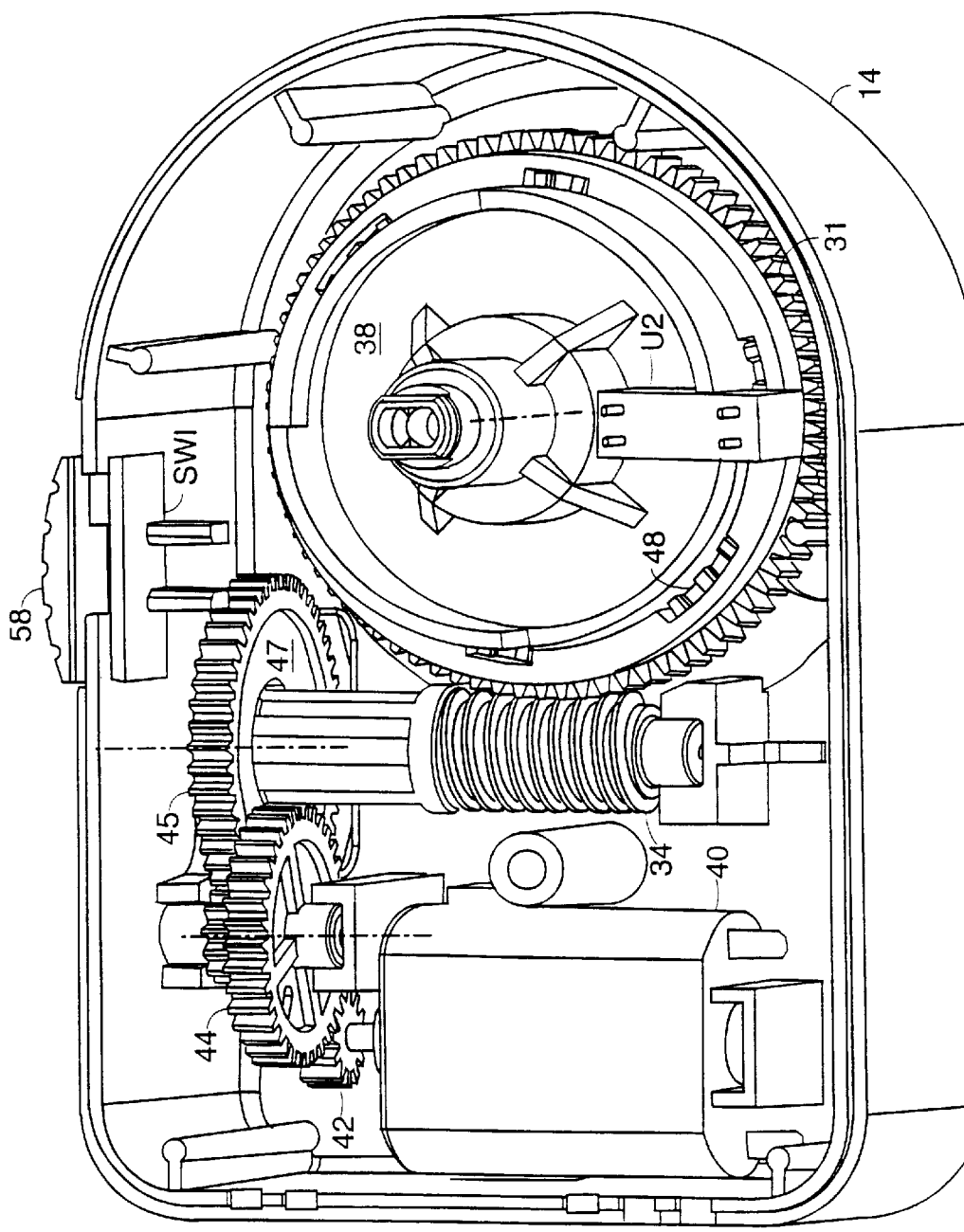
FIG. 2 is an isometric view of the interior of the actuator.

Referring to FIG. 2, a motor 40 turns a pinion 42, which in turn drives a cluster gear 44, consisting of a large and small spur gear molded as one plastic part. Cluster gear 44 drives a second cluster gear 45, consisting of a small spur gear 47 and a worm gear 34 also molded as one plastic part. The worm gear engages drive gear 31, which, in turn, rotates drive member 47, which, in turn, rotates valve stem 16. The entire gear train (pinion gear 42 through drive gear 31) provides a 960:1 increase in torque. The worm gear 34 and drive gear 31 provide an 80:1 increase.

Figure 3:
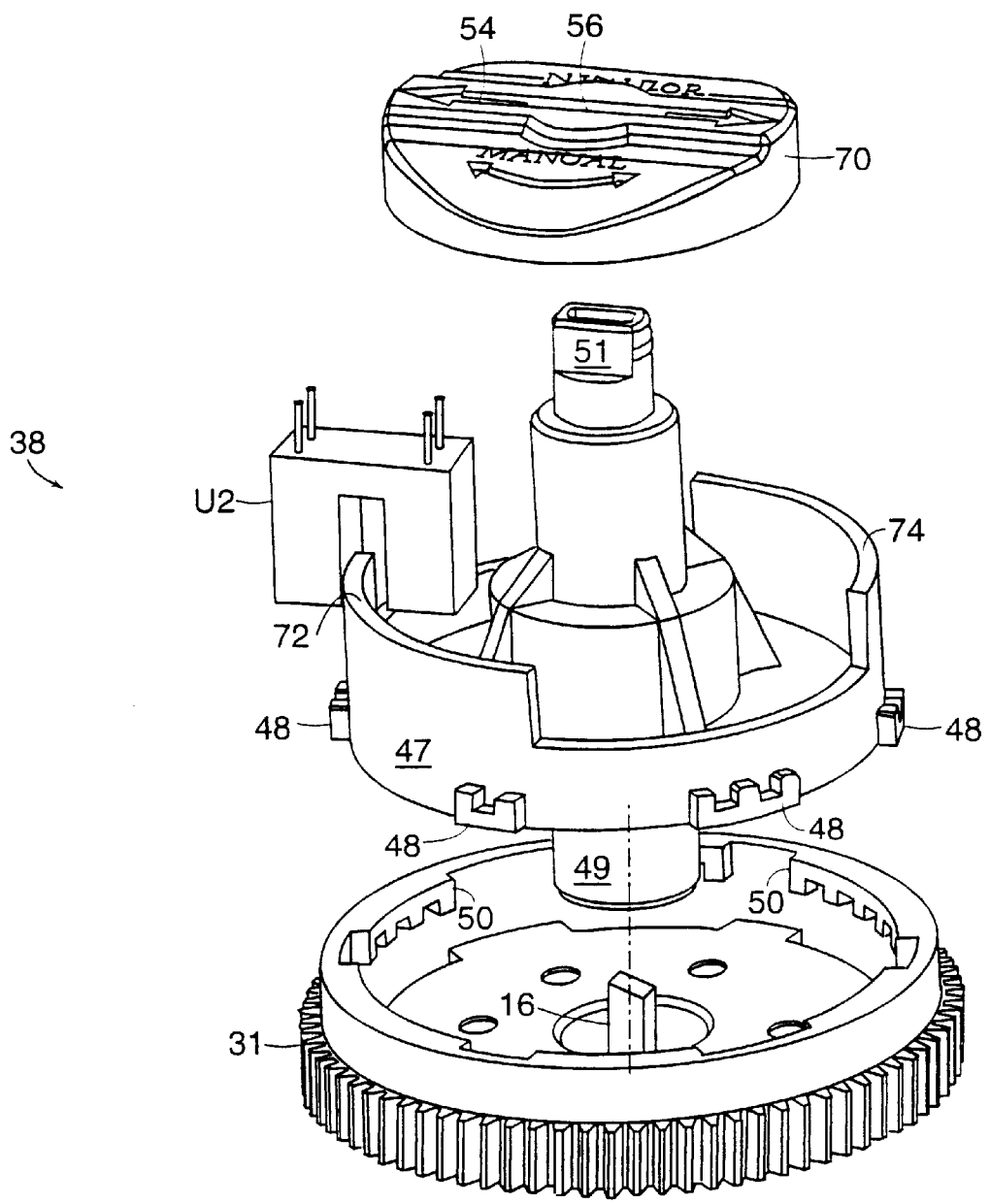
FIG. 3 is an isometric, exploded view of components of the clutch mechanism of the actuator.
Figure 4A:
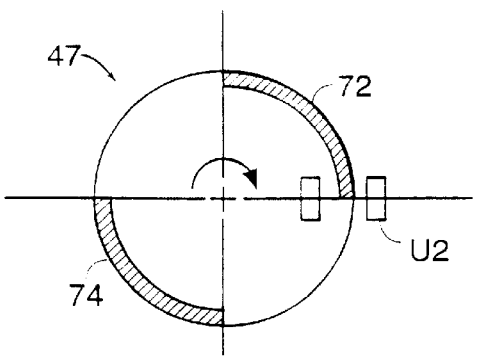
FIGS. 4A–4D are diagrammatic views of the optical sensor and drive member of the actuator in four different positions.
Figure 4B:
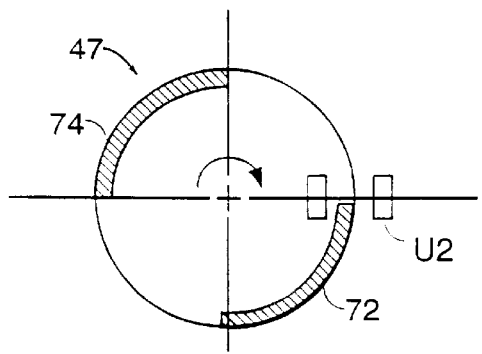
Figure 4C:
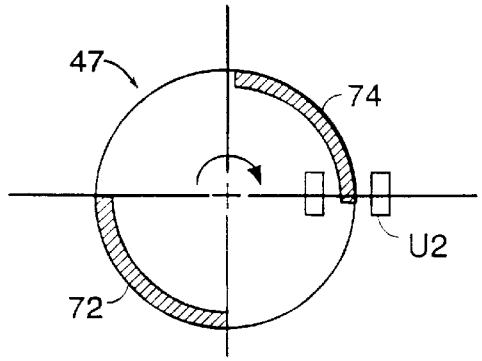
Figure 4D:
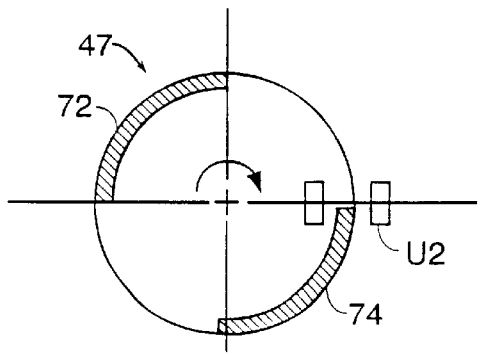

Referring to FIG. 3, the ball valve 12 may be manually opened and closed by depressing and turning a knob 70 (FIG. 3) exposed above the top cover (not shown) of the actuator. The knob is connected to stem 16 of the ball valve via drive member 47, and can be manually disengaged from drive gear 31 using a clutch mechanism 38. Normally, valve clutch teeth 48 on the drive member interlock with valve teeth 50 on the drive gear. A compression spring 32 (FIG. 1) wraps around shaft 49, and provides an upward force on drive member 47 to keep the teeth engaged. Manual movement of the valve is not possible with the teeth engaged, as such movement would require that drive gear 31 turn worm gear 34 in reverse (the 80:1 torque ratio of the worm and drive gears prevents that from happening). To manually rotate the valve, the valve clutch teeth 48 are disengaged from the valve teeth 50 by pressing downward on knob 70 (FIG. 3) and rotating drive member 47. Because the drive member is directly connected to the valve stem 16, rotation of knob 70 results in rotation of the ball valve. Once the clutch is disengaged, the valve may be rotated in either direction. After the valve has been manually rotated to a desired position, pressure is removed from the knob, spring 32 causes the clutch teeth to reengage. A valve position indicator 54 is molded into knob 70, to provide a visual indication to the valve operator of the current position of the valve. A notch 56 is provided in the knob to permit a screwdriver, or other thin rigid object, to be used to turn the valve.

The electronic circuitry controlling operation of the actuator depends on an optical sensor U2 (FIGS. 3 and 4A–4D)

to determine the position of the valve. The sensor is positioned so its light path is alternately blocked and unblocked as drive member 47 is turned. Projections 72, 74 extending from the drive member pass through the optical path of the sensor.

FIGS. 4A–4D illustrate operation of the sensor. Projections 72, 74 are positioned on drive member 47 so that the sensor is blocked in two quadrants of rotation of the drive member. Each of projections 72, 74 blocks the optical sensor over 90° of travel, leaving 90° between them in which the sensor is not blocked. In operation, the circuitry controlling motor 40 will turn the motor on and keep it on until a change of state occurs at the optical sensor. E.g., if movement of the valve were to begin with the drive member in the position shown in FIG. 4A, in which the optical sensor is blocked by projection 72, movement would continue for approximately 90 degrees of travel, until the drive member rotated to the position shown in FIG. 4B, wherein projection 72 has just moved out of the path of the optical sensor. (A natural lag between the moment that the sensor detects a change in state and actual cessation of movement assures that the actuator stops a small angular displacement beyond the position at which the optical sensor became unblocked; this assures that vibration will not cause the sensor to become blocked again and restart.) This 90 degrees of movement would have either opened or closed the ball valve. If further movement of the ball valve were called for (e.g., if the valve were now open, and the circuitry called for the actuator to close the valve), the motor would be turned on and the valve would continue to rotate for approximately another 90 degrees of travel to the position shown in FIG. 4C, at which point the optical path is again blocked, this time by projection 74.

Figure 5:
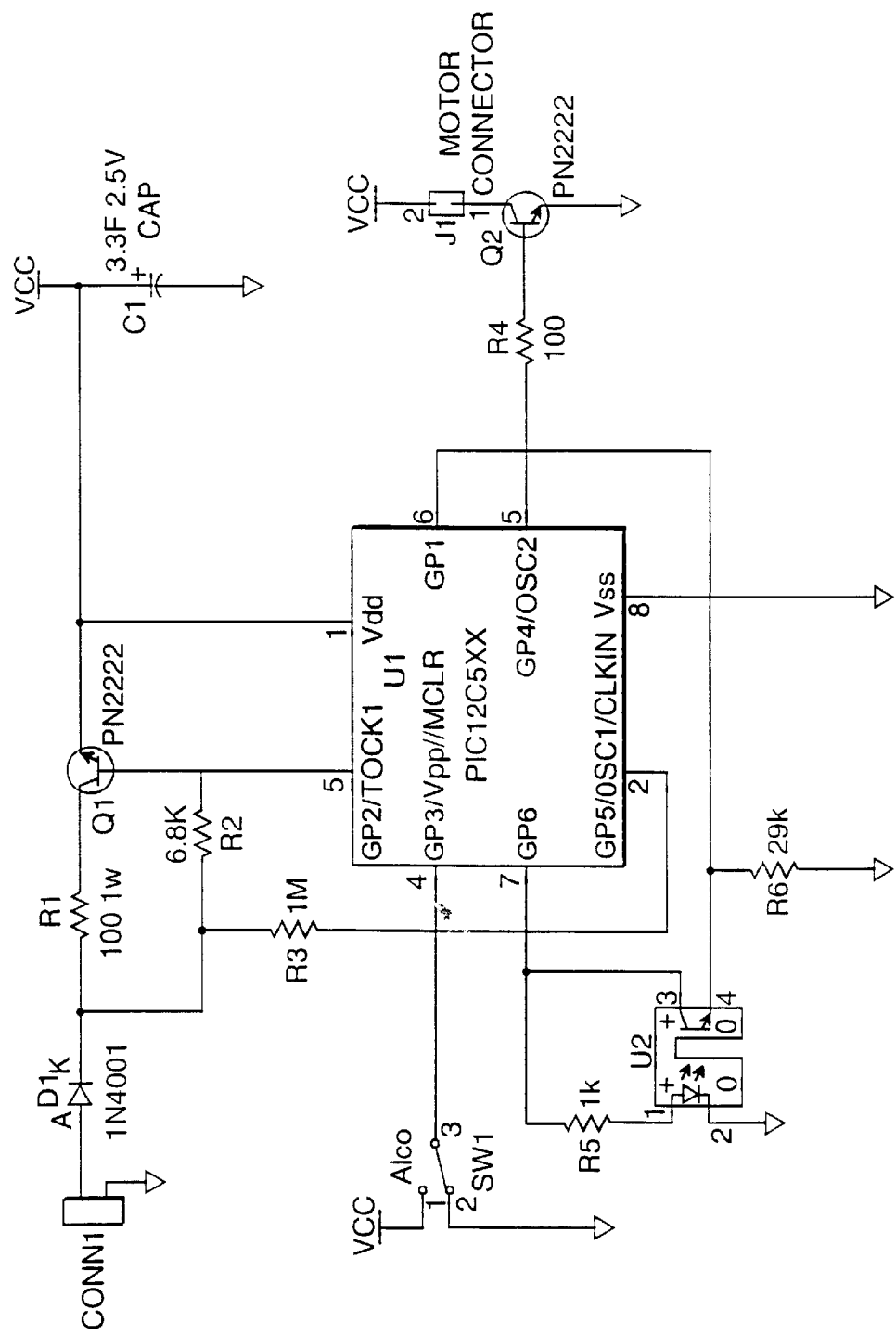
FIG. 5 is a schematic of the electronics of the actuator.

FIG. 5 is a schematic of the electronic circuitry of the actuator. At the heart of the circuitry is a microprocessor U1, which has programmable pins GP0, GP1, GP2, GP3, GP4, and GP5, a power supply pin Vdd, and a ground pin Vss. Power (24V AC) is supplied to the circuitry through two-pin connector CONN1. Typically, a 24V AC transformer is connected to CONN1 through a thermostat. When the thermostat turns on, 24V AC flows through CONN1 and into the power supply circuitry (diode D1, resistors R1 and R2, and transistor Q1), which sets supply voltage Vcc.

A capacitor C1 with a capacitance of 3.3 F is connected between Vcc and ground. During normal operation, the capacitor C1 charges to 2.5V to provide power to the motor 40, as described below. A switch SW1 is used to configure the zone valve 10 to be either normally open or normally closed. The position of switch SW1 can be changed by an operator by means of a slide knob 58 accessible on the exterior of the actuator assembly 14 (FIG. 2).

Power to optical sensor U2 is provided at pin GP0 of the microprocessor U1. When the light path to the optical sensor U2 is blocked, pin 4 of the sensor outputs a logical LO. When the light path is not blocked, pin 4 outputs a logical HI.

A two-pin motor connector J1 provides power to motor 40. Supply voltage Vcc is delivered at one pin. The other pin is connected to gating transistor Q2, which is in turn controlled by the microprocessor. When microprocessor pin GP4 is HI, transistor Q2 turns on, supplying power to the motor 40. Otherwise, power to motor 40 is cut off.

The circuitry shown in FIG. 5 may be powered by AC power supplied at connector CONN1 ranging from approximately 8V to approximately 40V. Diode D1 converts the supplied power from AC to DC (the same power supply would also function if supplied with DC power). When transistor Q1 is on, capacitor C1 is charged by the power supplied at connector CONN1 minus the voltage drop across the circuit consisting of diode D1, resistor R1, and transistor Q1. Capacitor C1 will charge when at least 2.5V is present at Vcc. Taking into account the voltage drop across D1, R1, and Q1, and the power necessary to run the microprocessor U1 and the motor 40, the circuitry shown in FIG. 5 can operate with a minimum of approximately 8V AC. As the supplied voltage is increased, capacitor C1 will continue to charge and sufficient power will be supplied to the microprocessor U1 and to the motor 40.

Figure 6:
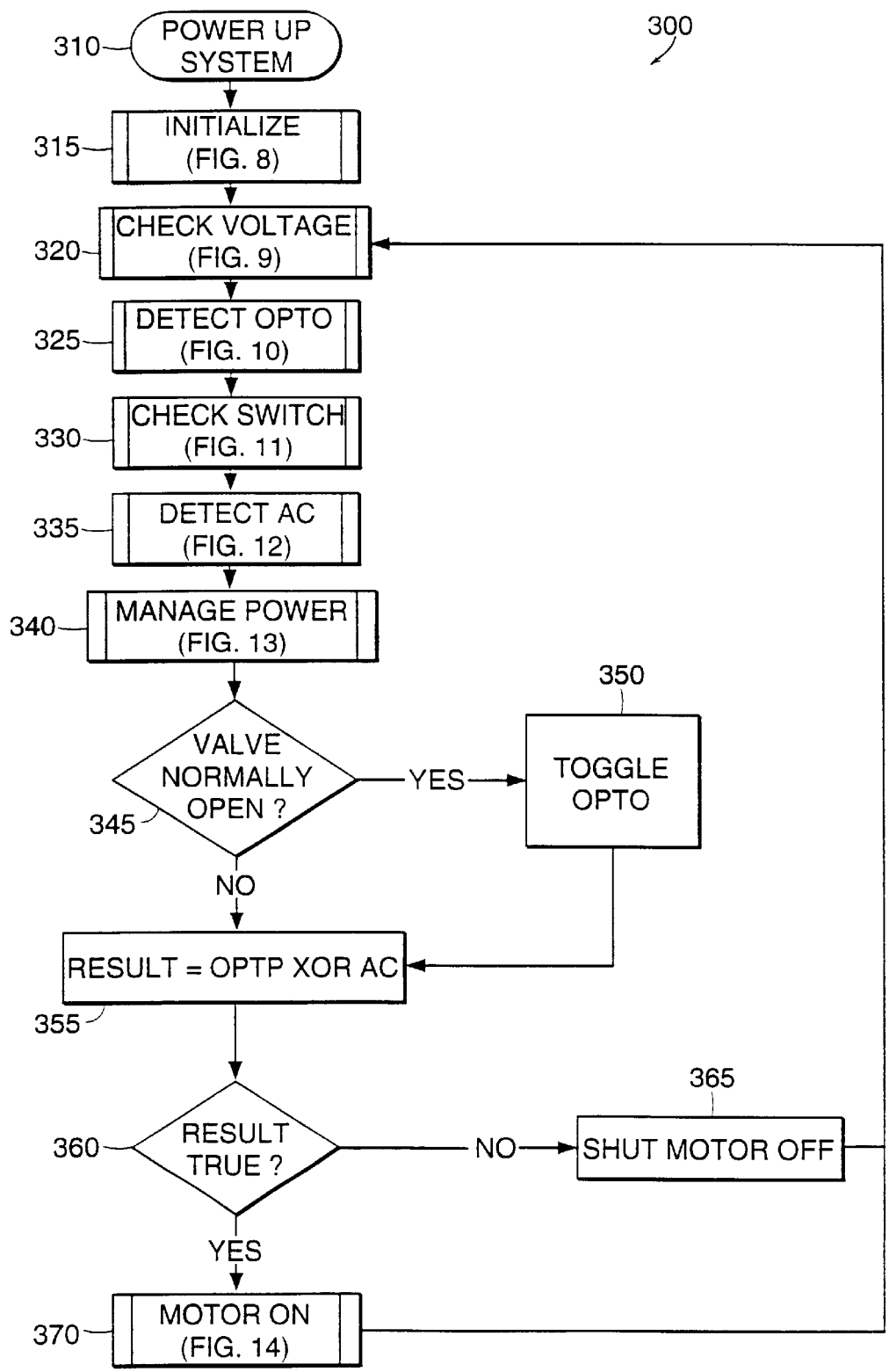
FIGS. 6–13 are flow charts of the processes followed by the microprocessor in controlling the actuator.

FIG. 6 is a flow chart of the process followed by the microprocessor U1 in controlling the motor 40. When power to the microprocessor U1 is turned on (step 310), state variables and other parameters are initialized (step 315). Next, the main control loop is entered. The loop begins by checking the voltage at the microprocessor's Vdd input, and determining whether there is sufficient power to power the motor 40 (step 320). The output of the optical sensor U2 is then checked to determine whether the zone valve 10 is passing in front of the optical sensor (step 325). The microprocessor U1 then obtains the current state of switch SW1 (step 330), and detects whether an AC signal is present at pin GP5 (step 335). Next, the microprocessor U1 decides whether or not to continue charging capacitor C1 (step 340).

In steps 345–365, the microprocessor U1 decides whether the motor 40 should be turned on or off. If the zone valve 10 is normally closed (decision step 345), then the Result register of the microprocessor U1 is assigned the value OPTO XOR AC (step 355). If the zone valve 10 is normally open, (as indicated by switch SW1 being in position 1) (decision step 345), then the OPTO flag is toggled (step 350) before assigning to the Result register the value OPTO XOR AC (step 355). A Result register value of TRUE indicates that, if there is sufficient power, the motor 40 should be turned on. A Result register value of FALSE indicates that the motor 40 should be turned off.

The process 300 shown in FIG. 6 is now described in more detail.

Figure 7:
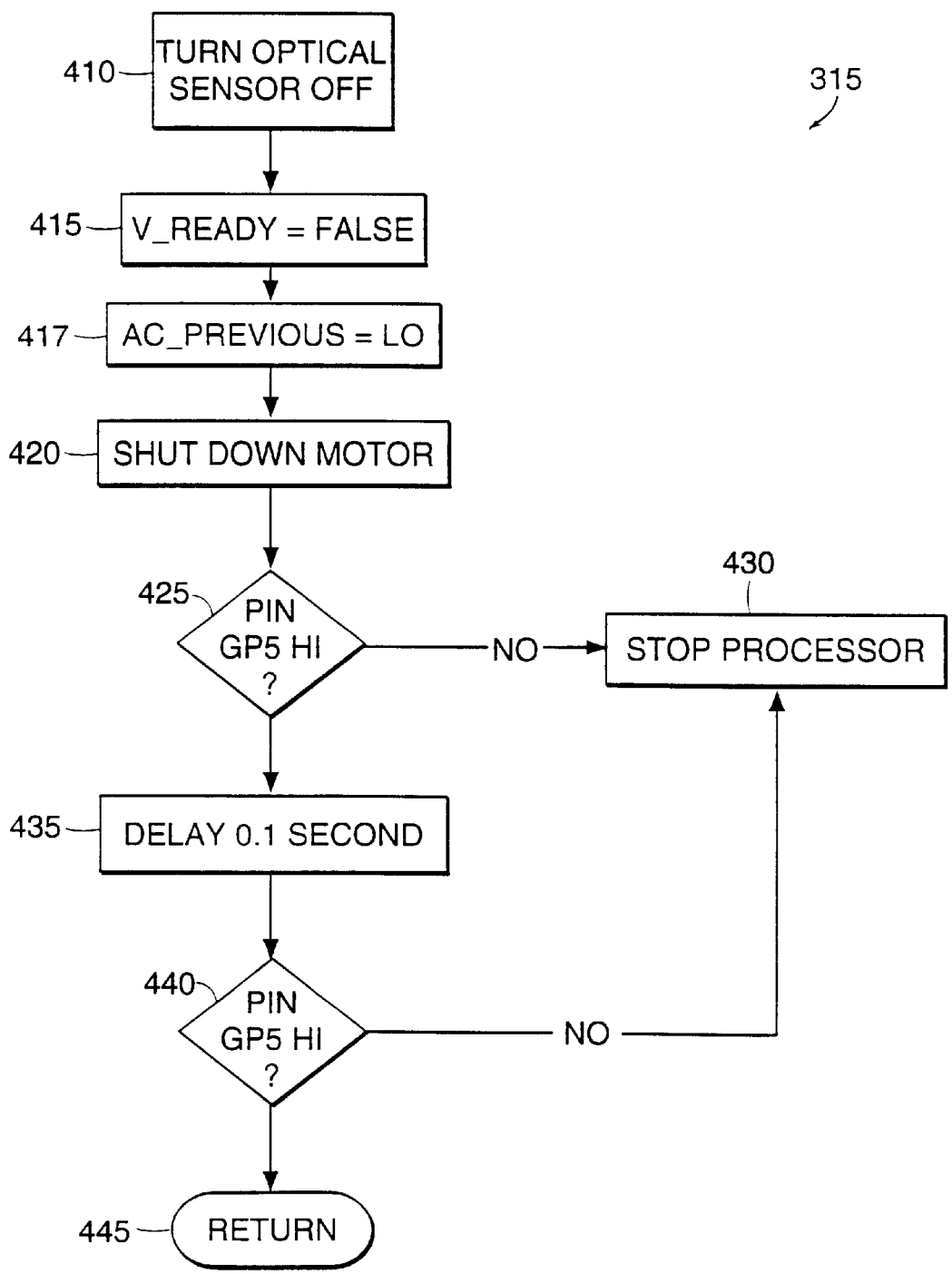

Referring to FIG. 7, initialization (step 315) proceeds as follows. First, the optical sensor U2 is turned off by de-asserting pin GP0 (step 410), in order to conserve power. Next, a flag V_READY, which is used to indicate whether the capacitor C1 has been fully charged, is initialized to FALSE (step 415). A variable AC_PREVIOUS, used by the method of FIG. 11 and described in more detail below, is initialized to LO (step 417). Next, the motor 40 is turned off by de-asserting pin GP4 in order to conserve power (step 420). Next, if pin GP5 is HI (decision step 425), indicating the possible presence of an AC signal (or DC signal in the event that the power supplied to the actuator is DC instead of AC), the microprocessor U1 delays for one tenth of a second, and then checks pin GP5 again to verify the presence of an AC (or DC) signal (step 440). If pin GPS is not HI during both steps 425 and 440, then the presence of an AC signal has not been verified, and the microprocessor U1 goes into sleep mode (step 430). Once in sleep mode, the microprocessor U1 will wake up again in approximately one second and begin again at step 315. If pin GP5 is HI at steps 425 and 440, then control proceeds to FIG. 9 (step 445).

Note that if an AC signal is present and the microprocessor U1 is either turned off or in sleep mode, then pin GP2 will act as an open circuit (exhibit high impedance), in which case transistor Q1 will turn on, allowing the AC signal to charge capacitor C1.

Figure 8:
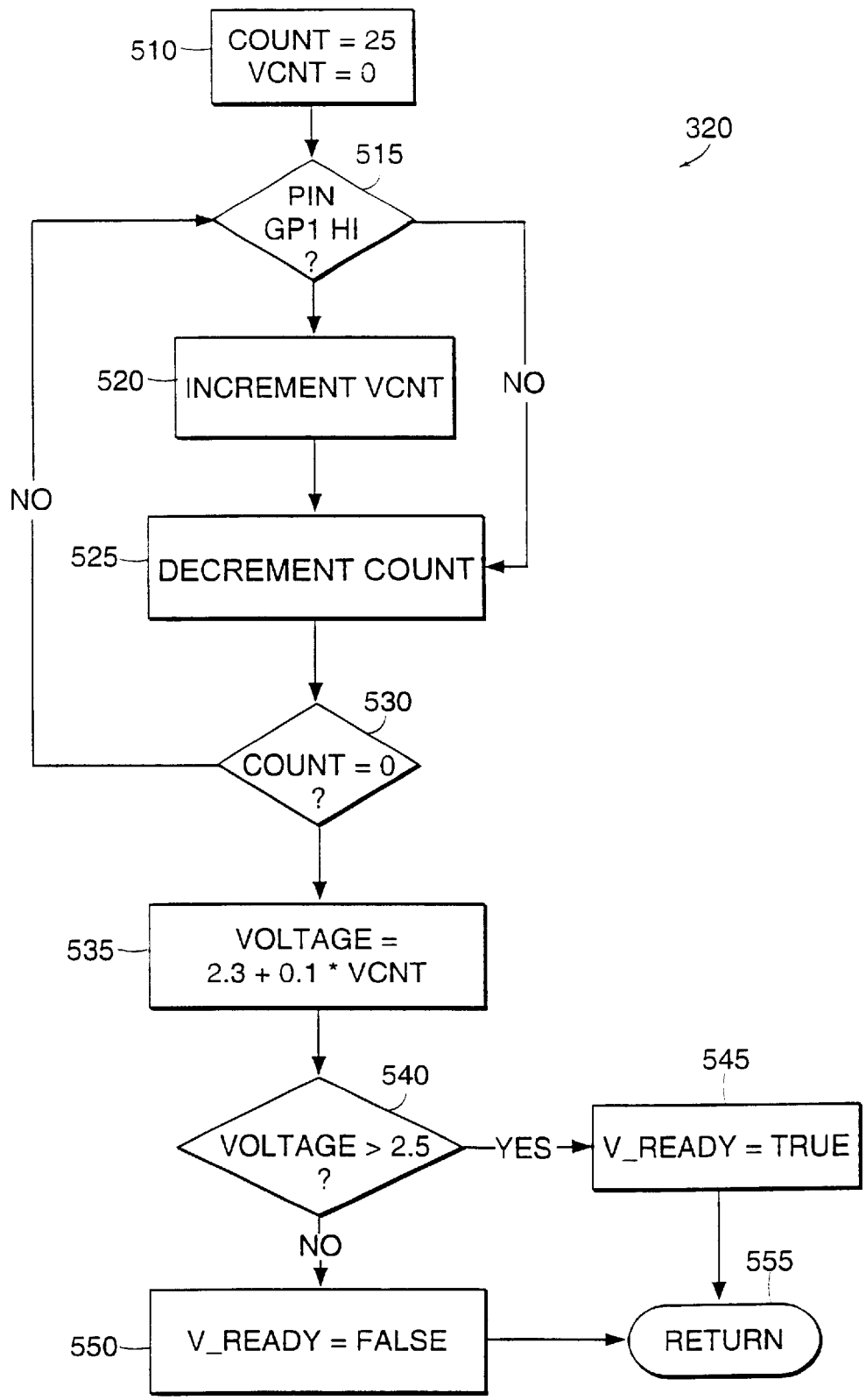

Referring to FIG. 8, the microprocessor U1 estimates the voltage at pin Vdd by as follows. First, a local variable COUNT is initialized with a value of 25, and a local variable VCNT is initialized with a value of zero (step 510). Next, the microprocessor U1 determines whether pin GP1 is HI (decision step 515). If GP1 is HI, then VCNT is incremented (step 520). This process repeats 25 times (steps 515–530). Whether pin GP1 is HI is an indicator of the voltage at pin Vdd because pins GP1 and Vdd are internally connected by a single 25 kΩ resistor (not shown). The microprocessor U1 estimates the voltage Vdd as Voltage=2.3+0.1* VCNT (step 535). If Voltage>2.5 (decision step 540), indicating that the capacitor C1 has been fully charged, then a flag V_READY is set to TRUE (step 545). Otherwise, the V_READY flag is set to FALSE (step 550)

Figure 9:
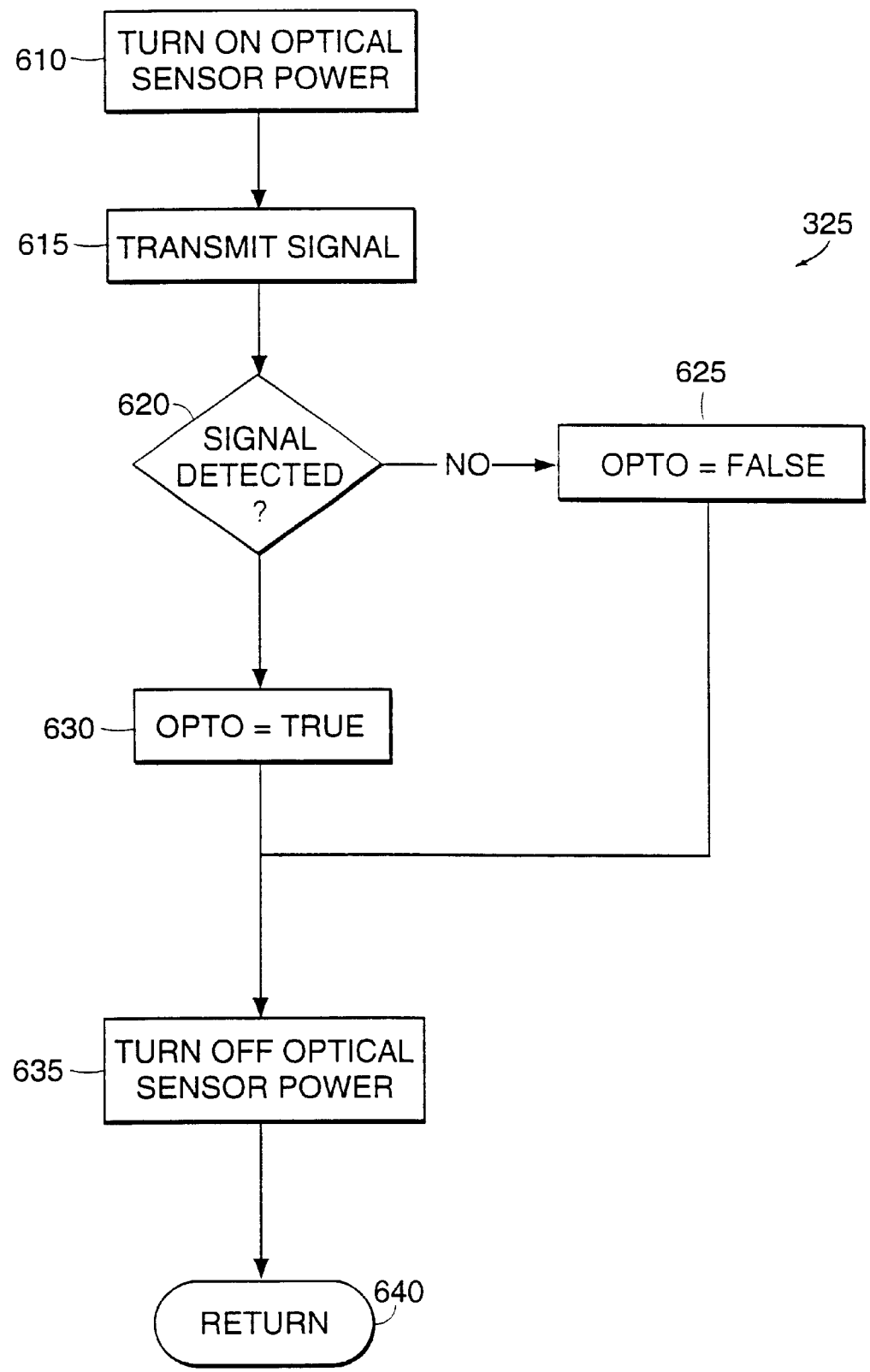

FIG. 9 shows a method used by the microprocessor U1 to determine whether the optical sensor U2 is blocked. The result of the method of FIG. 9 is to set the OPTO flag to TRUE if the optical sensor U2 is not blocked, and to set the OPTO flag to FALSE if the sensor is blocked. First, power to the optical sensor U2 is turned on by asserting pin GP0 (step 610). Next, an arbitrary 8-bit binary code is transmitted through pin GP0, one bit at a time (step 615). As the microprocessor U1 transmits the code, the microprocessor U1 monitors the input at pin GP1. If the value of the bit received at pin GP1 is the same as the value of the bit transmitted at pin GP0, then the optical sensor is not blocked. If all of the bits in the transmitted code are correctly received at pin GP1 (decision step 620), then the OPTO flag is assigned a value of TRUE (step 630). Otherwise, the OPTO flag is assigned a value of FALSE (Step 625). In either case, the power to the optical sensor U2 is then turned off by de-asserting pin GP0 (step 635). Eight bits, rather than a single bit, are transmitted and tested in order to take into account manufacturing imperfections in the zone valve 10 which might cause spurious readings of the optical sensor when an edge of the drive member 47 is in front of the sensor. Requiring that eight consecutive readings of the optical sensor output all match the expected readings ensures that the zone valve 10 has completed a state transition.

Figure 10:
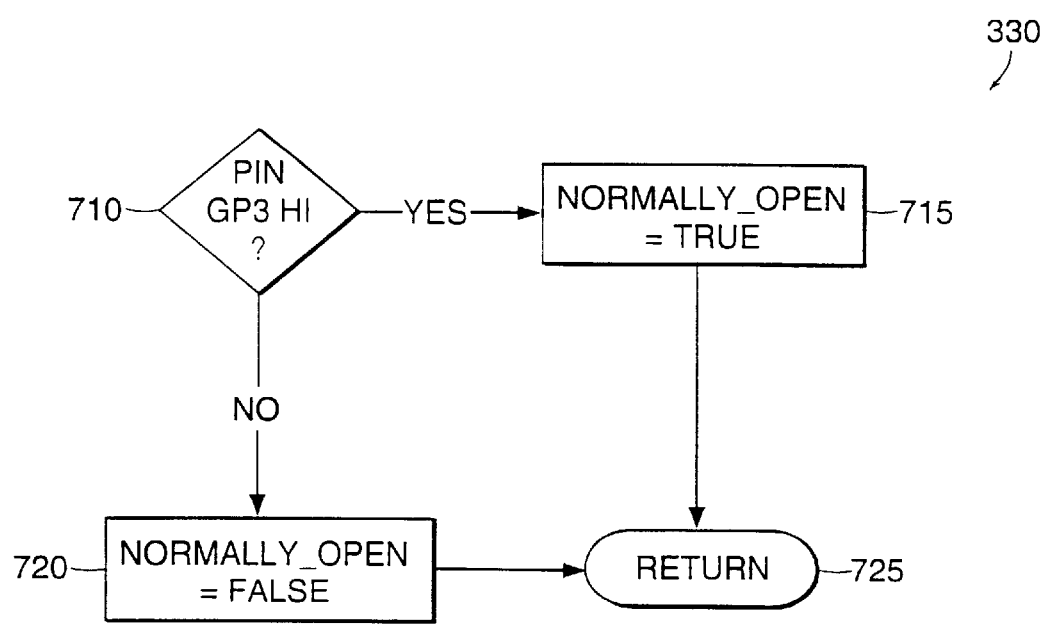

Referring to FIG. 10, the NORMALLY_OPEN flag, which indicates whether the zone valve 10 is normally open or normally closed, is set as follows. If pin GP3 is HI (decision step 710), then the NORMALLY_OPEN flag is assigned a value of TRUE (step 715). Otherwise, the NORMALLY_OPEN flag is assigned a value of FALSE (step 720).

Figure 11:
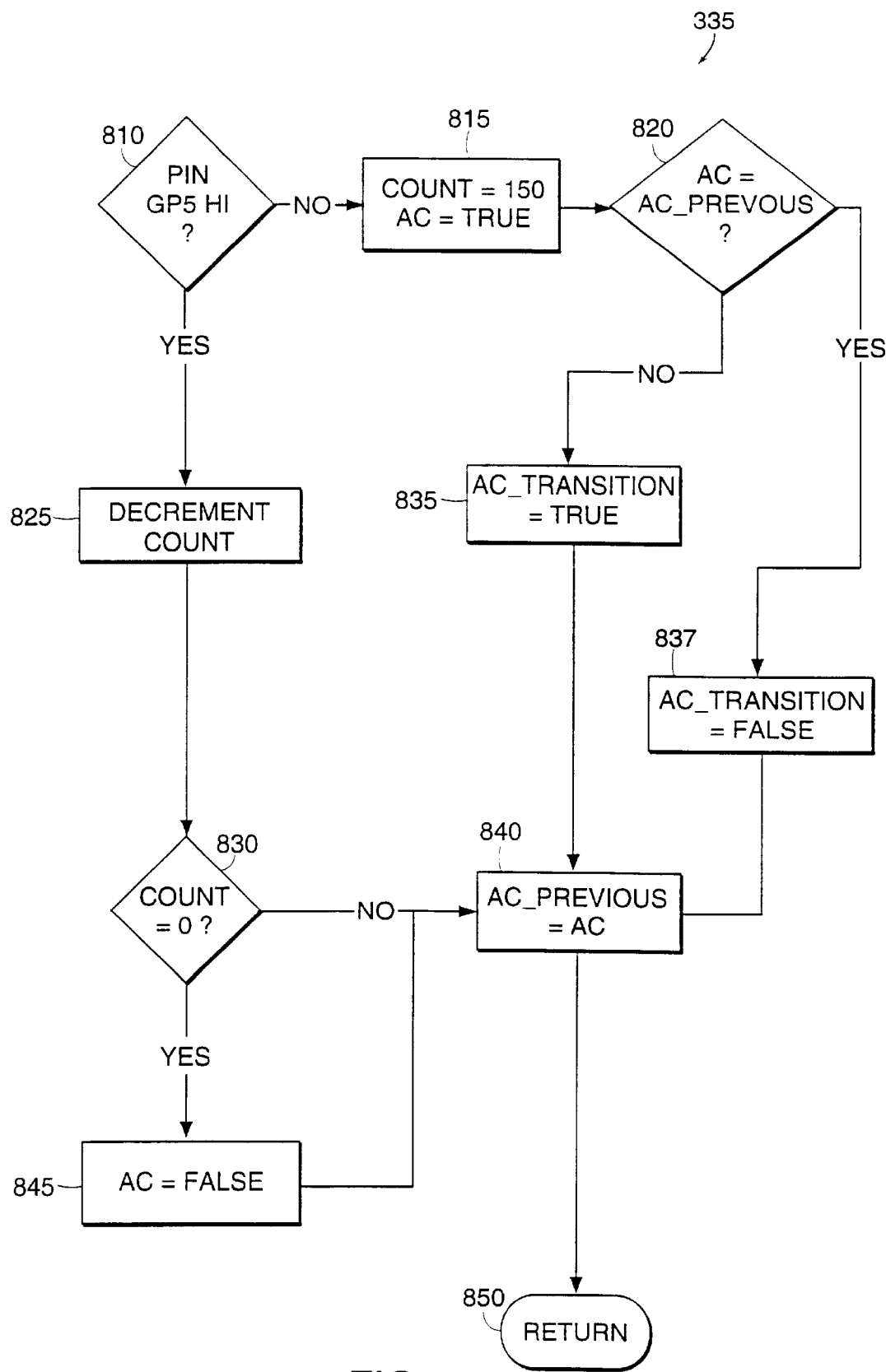

Referring to FIG. 11, a flag AC is assigned a value of TRUE when an AC signal is detected at pin GP5, and is assigned a value of FALSE when no AC signal is detected for a period of time. In addition, a flag AC_TRANSITION is assigned a value of TRUE when the flag AC changes value, and is assigned a value of FALSE otherwise.

More specifically, the values of AC and AC_TRANSITION are assigned as follows. First, the microprocessor U1 determines whether pin GP5 is HI (decision step 810). If it is not, then the microprocessor U1 initializes a variable COUNT to a value of 150 and assigns the value TRUE to the flag AC (step 815). Then, if AC is not equal to AC_PREVIOUS (decision step 820), then the value of AC_TRANSITION is set to TRUE (step 835). Otherwise, the value of AC_TRANSITION is set to FALSE (step 837). The value of AC_PREVIOUS is then assigned the value of AC (step 840).

If pin GP5 is HI (decision step 810), then COUNT is decremented (step 825). If COUNT=0 (decision step 830), then AC is set to FALSE (step 845).

Figure 12:
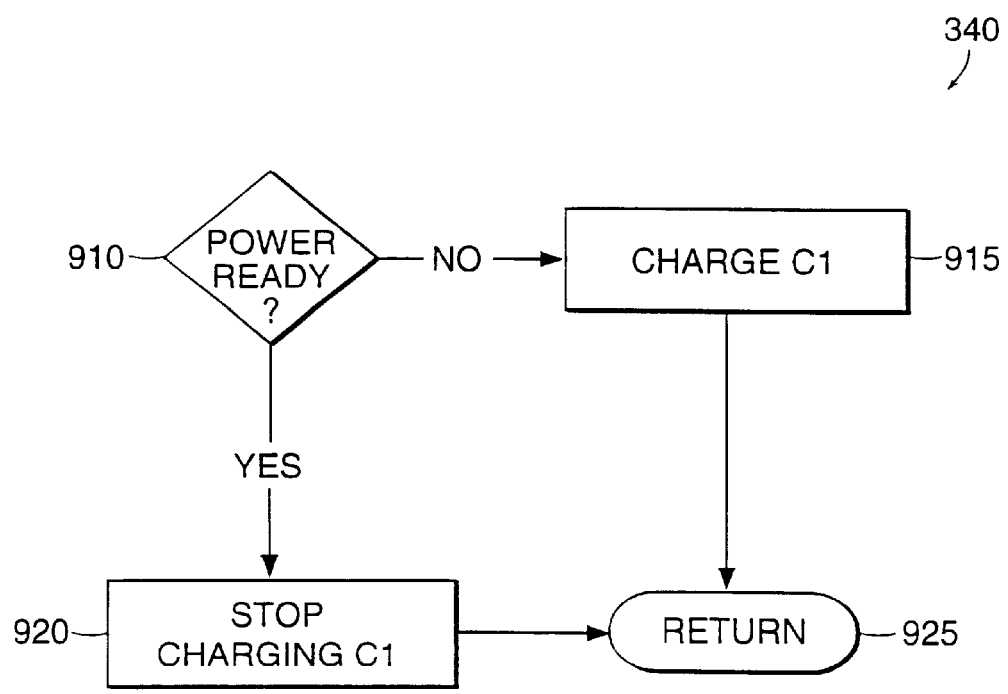

Referring to FIG. 12, the microprocessor U1 decides whether to continue charging capacitor C1 as follows. If V_READY is FALSE (see FIG. 8) (decision step 910), then capacitor C1 is charged by putting pin GP2 into input mode, causing pin GP2 to act like an open circuit (step 915). If V_READY is TRUE (decision step 910), then the microprocessor U1 stops charging capacitor C1 by putting pin GP2 into output mode and asserting LO, causing pin GP2 to act like a short circuit (step 920). This turns off transistor Q1, which prevents capacitor C1 from charging.

After the method of FIG. 12 has completed, the microprocessor decides whether the motor should be turned on or off. If the switch SW1 is in position 1, indicating that the zone valve 10 is normally open (decision step 345), then the OPTO flag is toggled (step 350). Then, the Result register is assigned the value OPTO XOR AC. A Result value of TRUE indicates that the motor 40 should be turned on, if there is sufficient power. A Result value of FALSE indicates that the motor 40 should be turned off. The expression OPTO XOR AC results in the appropriate values for the Result register as follows.

TABLE 1

| SENSOR | OPTO | AC | Result (Normally Open) | Result (Normally Closed) |
|---|---|---|---|---|
| BLOCKED | FALSE | FALSE | TRUE | FALSE |
| BLOCKED | FALSE | TRUE | FALSE | TRUE |
| UNBLOCKED | TRUE | FALSE | FALSE | TRUE |
| UNBLOCKED | TRUE | TRUE | TRUE | FALSE |

Referring to Table 1, consider, for example, the case in which the zone valve 10 is normally closed (i.e., switch SW1 is in position 2). In this case, if OPTO is FALSE (i.e., the optical sensor is blocked, indicating that the zone valve 10 is closed) and AC is FALSE (indicating that the thermostat is not requesting that the zone valve 10 change its state), then the zone valve 10 is in the correct position. Therefore, the value of Result is FALSE, indicating that the motor should be turned off. Consider next, for example, the case in which the zone valve 10 is normally open (i.e., switch SW1 is in position 1). In this case, if OPTO is FALSE (i.e., the optical sensor is blocked, indicating that the zone valve 10 is closed) and AC is FALSE (indicating that the thermostat is not requesting that the zone valve 10 change its state), then the zone valve 10 should return to its default position of open. Therefore, the value of Result is TRUE, indicating that the motor 40 should be turned on. The values in the remaining cells in Table 1 can be verified similarly.

Figure 13:
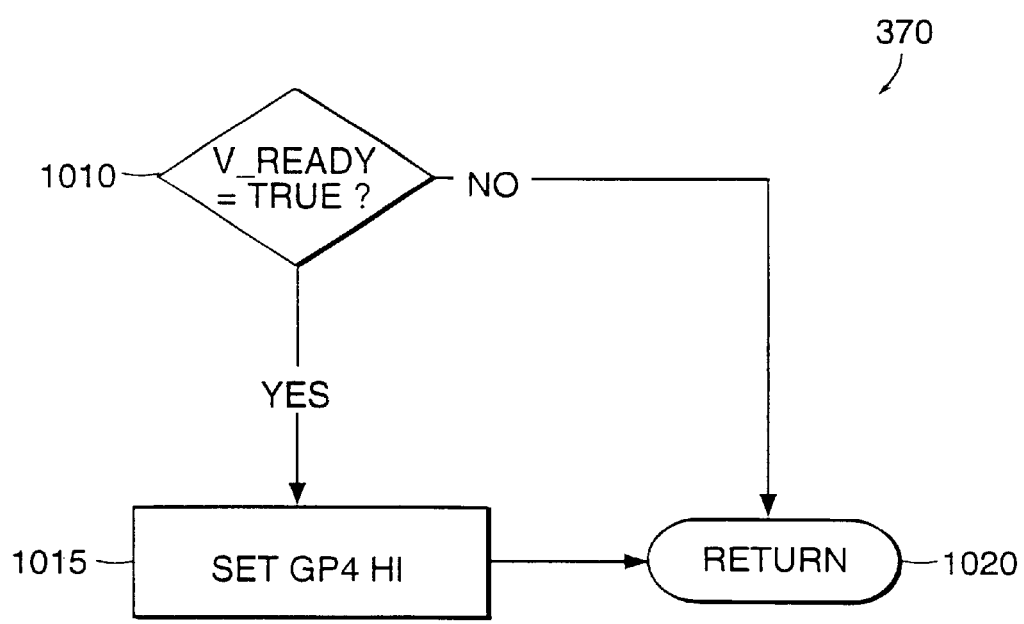

Once the value of Result has been calculated, the microprocessor U1 decides whether to actually provide power to the motor 40 as shown in FIG. 13. If V_READY is TRUE, then pin GP4 is asserted, turning the motor 40 on (step 1015). If V_READY is FALSE, then the motor 40 is not turned on. This ensures that the motor 40 is not turned on unless there is sufficient power.

Other embodiments of the invention are within the scope of the following claims. For example, the invention may be used to provide other types of valves, e.g., a mixing valve or a two-way valve.

In the case of a mixing valve, a different ball element, with a central aperture communicating with port 37c (FIG. 1) at the base of the valve body, replaces the ball element shown in FIG. 1. Ports 37a, 37b become inlets (e.g., hot and cold water) and port 37c is the outlet. The left-to-right aperture in the ball element, which is straight in the embodiment of FIG. 1, becomes curved so that rotation of the ball element causes a change in the proportions of fluid flowing through the valve from the two ports. By using a noncircular cross motion for the aperture (e.g., tear drop), a linear relationship can be achieved between ball rotation and flow. Projections 72, 74 are also configured differently so that the output of the optical sensor changes state after the ball element has turned sufficiently to complete close off one of the ports. E.g., one of the projections might block the sensor to indicate that port 37a was shutoff, and the other of the projections might do the same for port 37b. In operation, movements of the mixing valve are controlled by activating motor 40 for short durations to make small adjustments to the position of the ball element. Polarity of the power is reversed to change the direction of rotation. During these movements the optical sensor does not provide information; it is only when the ball element has reached a point at which one or the other of the ports is closed off that the sensor functions. In effect, it replaces the mechanical stop that would be found in a conventional mixing valve.

For a two-way valve, the right-to-left aperture in ball element extends from the center of the ball in only direction, so that by rotating the valve 180 degrees, central port 37c can be connected to one or the other of ports 37a, 37b. The same configuration of projections 72, can be used, or alternatively, a single projection ending 180 degrees could be substituted.

What is claimed is:

1. In an actuator for actuating a valve in a hydronic system, the valve having a first position in which fluid flow along one path may occur and a second position in which fluid flow is blocked or may occur along another path, the method of operating the actuator comprising:

prior to initiating movement of the valve, determining the charge on a capacitive power source and determining the energy required to complete the valve movement prescribed;

deciding to initiate movement if the charge on the capacitive power source is sufficient to provide the energy required to complete the movement; and deciding not to initiate movement if the charge on the capacitive power source is insufficient to provide the energy required to complete the movement.

\* \* \* \* \*

UNITED STATES PATENT AND TRADEMARK OFFICE
CERTIFICATE OF CORRECTION

PATENT NO. : 6,250,323 B1
DATED : June 26, 2001
INVENTOR(S) : Richard A. Genga and Hamid Pishdadian It is certified that error appears in the above-identified patent and that said Letters Patent is hereby corrected as shown below:

<u>Title page,</u>
Item [57], ABSTRACT,
Line 1, "An" should be -- A --.
Line 8, after "conditions", insert: -- The charge of the capacitive power source is predetermined prior to initiating movement of the valve. The actuator then initiates a prescribed movement of the valve if the charge on the capacitive power source is sufficient to provide the energy required to complete the movement. A worm gear is used in the drive train, and combined with clutch assembly to permit the valve to be operated manually. --

<u>Drawings,</u>
Sheet 11 of 13, FIG. 11, at Reference 820, "AC_PREVOUS" should be
-- AC_PREVIOUS --.

<u>Column 3,</u>
Line 3, "feature" should be -- features --.

<u>Column 6,</u>
Line 54, "GPS" should be -- GP5 --.

<u>Column 7,</u>
Line 31, "GPO" should be -- GP0 --.

<u>Column 9,</u>
Line 21, after "in", insert -- the --.
Line 22, after "only", insert -- one --.

UNITED STATES PATENT AND TRADEMARK OFFICE
CERTIFICATE OF CORRECTION

PATENT NO.   : 6,250,323 B1
DATED        : June 26, 2001
INVENTOR(S)  : Richard A. Genga and Hamid Pishdadian It is certified that error appears in the above-identified patent and that said Letters Patent is hereby corrected as shown below:

Column 10,
Line 2, after "72,", insert -- 74 --.

Signed and Sealed this

Eighteenth Day of June, 2002

*Attest:*

*Attesting Officer*

JAMES E. ROGAN
*Director of the United States Patent and Trademark Office*